Sept. 6, 1927. 1,641,923
G. H. DAVIS
MOLDING APPARATUS AND METHOD
Filed Sept. 18, 1925
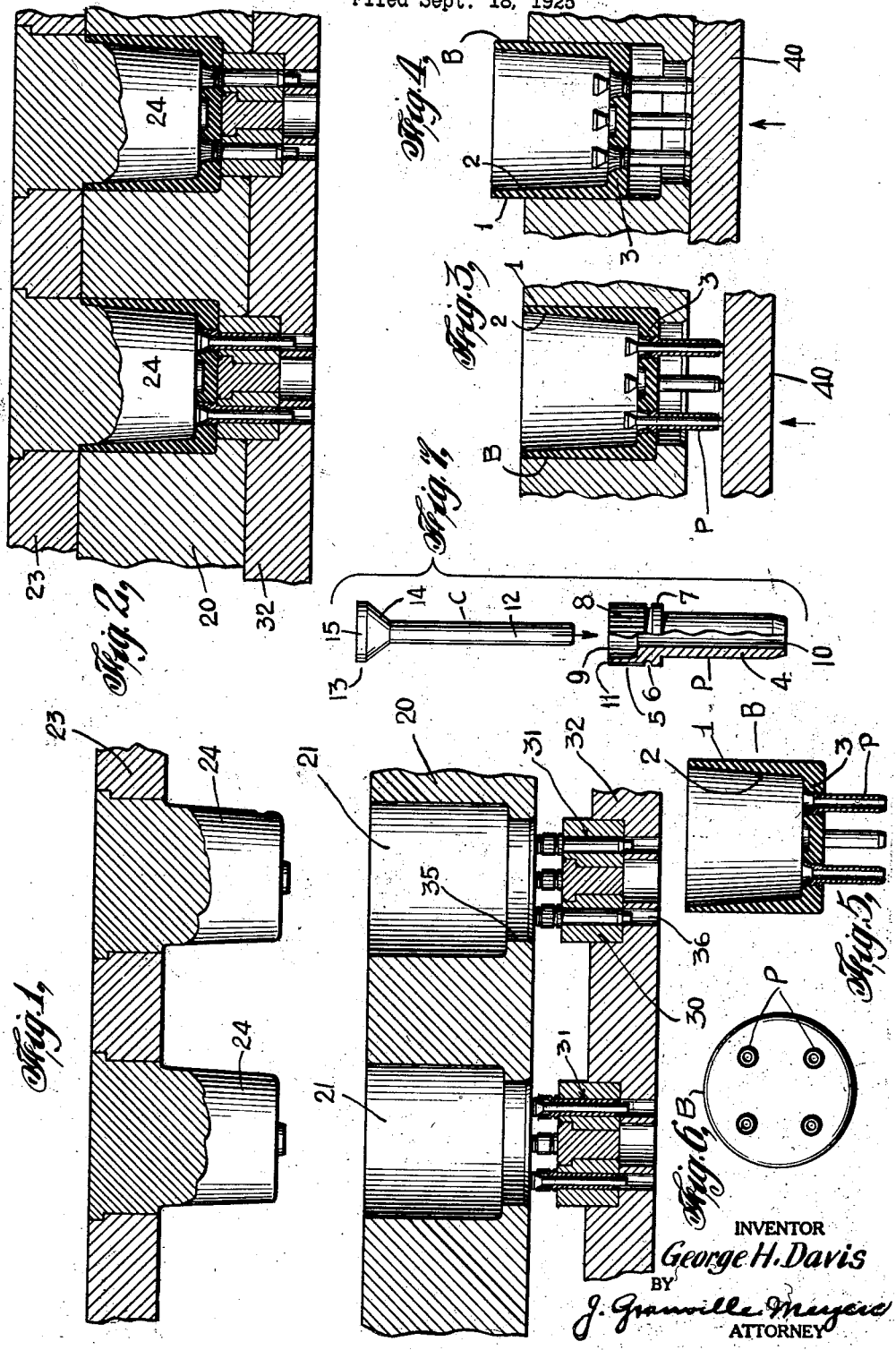
INVENTOR
George H. Davis
BY
J. Granville Meyers
ATTORNEY Patented Sept. 6, 1927.

1,641,923

UNITED STATES PATENT OFFICE.

GEORGE HOWLETT DAVIS, OF NEWARK, NEW JERSEY.

MOLDING APPARATUS AND METHOD.

Application filed September 18, 1925. Serial No. 57,129.

My invention relates to apparatus for and methods of producing articles from a great variety of moldable or plastic materials.

The present invention is similar in many respects to my companion application, Serial No. 57,128, filed September 18, 1925, and provides a method and means for producing molded articles with originally separate inserts incorporated therein. Specifically, the molded article chosen for illustration of the present invention is an audion tube base and the inserts are metal pins usually called "prongs." In distinction from the inserts employed in the companion application, which are originally part-tubular with solid heads, in the present instance the inserts are completely tubular and are devised for co-operation with an insert support, hereafter called an insert plate, and means thereon for supporting the prongs and passing them through insert holes in a chase body communicating with the mold pockets therein. To prevent the moldable material from passing into or through the tubular inserts, core pins are provided which are detachably placed in the hollow prongs and close the upper ends of the openings thereof during molding, and thereafter the core pins are removed, leaving the hollow prongs ready to receive terminals of valve elements of an audion bulb, these terminals being passed into the prongs from within and soldered to complete the electrical connection.

The invention also includes ejecting means to co-operate with the inserts and loosen or eject the completed articles from the mold pockets, and preferably, also, the ejecting means is so devised as to effect the loosening or partial discharge of the core pins from the prongs, as a part of the ejecting action. The invention also includes a method of molding conformable to the apparatus and the particular type of inserts.

While the specific adaptation of the apparatus and method for the production of the articles named, is a very important feature of the invention, this specific apparatus and method should also be taken, in a broader aspect of the invention, as merely representing any one of a number of different variations of apparatus and method which may be adapted within the principles of the invention for producing different specific articles, varying widely as to the shape or nature of the molded body and the inserts.

The accompanying drawing illustrates in a somewhat diagrammatic way representative molding apparatus which embodies the invention in one form, and also explains one exemplifying process. After considering these examples skilled persons will understand how many changes may be made both in the apparatus and method, and I contemplate the employment of any variations that are properly within the scope of the appended claims.

Fig. 1 is a vertical section of molding apparatus embodying the invention in one form, the parts being positioned for one of the early process operations.

Fig. 2 shows the parts in another position, representing a later process stage.

Fig. 3 shows another position.

Fig. 4 shows still another position of the parts.

Fig. 5 is an axial section of the completed articles.

Fig. 6 is a bottom plan of the same.

Fig. 7 shows one of the inserts or prongs partly in elevation and partly in section, and a core pin positioned for insertion in the prong.

The specific article chosen to represent the product is an audion tube base B, Figs. 5 and 6, the body of which is composed of a suitable moldable material, such as a synthetic resin (in pulverized form consisting of a suitable filler with the synthetic resin as a binder) which is molded and "set" under heat and pressure. For other classes of articles almost any plastic or moldable material may be employed, including other synthetic resins, other materials which require heat treatment during pressure, other materials of the class usually known as shellacs, which require preheating and cooling during pressing, or other plastics which do not require any heat treatment. The molded body in the case of a tube base has a substantially cylindrical side wall 1, this wall usually increasing in thickness from the lip to the bottom or in other words, the inner wall surface 2 is usually of substantially conical form. The bottom 3 is of substantial thickness, usually greater than the greatest thickness of the side wall. The inserts P in the present specific article are tubular brass prongs. For other types of tube bases or for other classes of articles, the material or form of the inserts may vary greatly. They may not even be of metal, since non-metallic inserts may be incorporated in many cases in the moldable main body B. The present specific inserts or prongs include the tubular lower portion 4, an enlarged upper portion 5 near the bottom which is formed an annular channel 6 leaving the circular flange 7. The exterior surface of the upper head portion 8 is preferably knurled or channeled as shown, to insure a firm adhesion to the molded material. The interior of the upper enlarged head 8 is counterbored or otherwise formed into an interior cup or enlargement 9 communicating with the main cylindrical bore 10 of the lower portion 4. The upper wall of the head 8 is preferably formed with a relatively thin lip 11.

To temporarily close the hollow inserts and especially to close their upper ends and prevent ingress of moldable material, core pins C are provided. Each pin includes a stem 12 and a head 13 which usually has an under tapered or conical portion 14 which may terminate in a shallow cylindrical portion 15 at the top of the head. A core pin is to be placed in each prong so that the stem is located in the lower bore 10 and a part of the head cone 14 rests on the lip 11, substantially in the position shown in Fig. 1. The stem is preferably (although not necessarily) of such length that a lower portion projects considerably below the lower end of the prong, as also shown in Fig. 1.

The mold apparatus proper comprises a central body or chase 20 having one or more mold pockets 21. Arranged for movable co-operation with the chase is a base plate or insert plate 32. Also arranged for movable co-operation with the chase is an upper plate, cope or force plate 23 having one or more integral or separate and inserted force plugs 24 arranged to co-operate with the mold pockets.

The insert plate may be adapted in various ways to detachably support the prongs with their core pins C for insertion in the mold pockets, for instance, by providing it with insert pins, as in the above mentioned companion application. In the present particular example, however, the base plate 32 is bored and counterbored to receive a plurality of plugs 30 each of which has a plurality of holes 31 arranged in conformity with the prong arrangement in the completed article, Fig. 6, and of a diameter to receive the lower cylindrical portion 4 of a prong with a fairly close but easy sliding fit. The periphery of the plug is diametered to have a close but movable fit within a cylindrical plug hole 35 provided in the chase, communicating with each mold pocket. Below the prong holes 31 of plugs 30, the insert plate is bored as at 36 to accommodate the lower ends of the core pins.

While the insert plate 32 is in accessible position, away from that shown in Fig. 1, it is loaded by placing a prong in each of the holes 31 of each of the plugs 30 in the position shown in Fig. 1, with the prong flanges 7 resting on the flat upper faces of the plugs. A core pin C is inserted in each prong and this insertion may be made either before or after the prongs are placed in the plugs 30. After all the inserts and core pins are positioned, and before the insert plate is moved to active position beneath the chase, the core pins or especially their heads 13 may be tightened in the prongs by applying a plate with suitable pressure or hammer blows on top of all the pin heads to force them down somewhat and slightly spread the lips 11 with which the conical head portions 14 will now tightly engage after the fashion of poppet valve in its seat. In some cases this operation may be dispensed with and the core pin heads will then be sufficiently tightened in their seats during the molding operation as sufficiently referred to later.

The insert plate is now positioned as in Fig. 1, and is moved upward in relation to the chase, suitable force being applied for this operation in any convenient way, for example, by the use of press mechanism substantially as disclosed in my prior application, Ser. No. 44,579, filed July 18, 1925, which includes a main press and a power sub-press provided with mold manipulation means. This sub-press which also represents the loading station at which the mold parts, as indicated in Fig. 1, may be positioned, will serve effectively for the power manipulation of the mold parts. In the upward movement of the insert plate all of the plugs 30 are inserted in the plug holes 35 with the upper faces of the plugs flush with the inner bottom surfaces of the mold pockets 21, as shown in Fig. 2. The head portions of the prongs are now positioned within the pockets with the entire heads located above the pocket bottoms.

Each pocket is then charged with a suitable quantity of the moldable material which in the case of a phenolic condensation product composition is in dry pulverized form. To insure sufficient material for each article the pockets may be slightly overcharged and in that case excess material will usually spread over the upper surface of the chase and connect the completed articles with a thin web or film, as sufficiently explained in the above mentioned companion application.

The force plate is now brought down to partly shape the moldable material and compress it about the prong heads, and in this operation the core pin heads close the prong openings and prevent any of the moldable material getting into the prongs. In some cases, for example, when a sub-press is used as in the above identified pending application, the plugs are not forced all the way down at the sub-press station, but are forced nearly down, and then all the mold parts are transferred to the main press where the main pressing operation is performed with application of heat to fuse and set the moldable material. In case the core pins head have not been fully forced down into the cup-like or chambered portions 9 of the prongs by a preliminary operation, as referred to above, these heads may be further forced down to insure tight engagement and spread the lips 11 either at the preliminary pressing at the sub-press station, or in the final pressing in the main press. These variable conditions are sufficiently represented in Fig. 2, where the force plate has been moved down in full contact with the upper face of the chase, and the plugs are fully inserted in the mold pockets. In this movement the bottom of each force plug has engaged the tops of the core pin heads and completed the forcing of these heads down into firm contact with the prongs and in fact preferably, as shown, the heads are forced down until their top faces are flush with the edges of the lips 11 so that the upper chambers 9 of the prongs are fully and tightly closed and the lips 11 are substantially flared outward as shown in Fig. 2.

The moldable material is now fused and set under heat and pressure for a suitable time and firmly adheres to and about the insert heads and is in fact practically integrally united thereto. After removal from the main press, the force plate is moved upward carrying the plugs away from the chase and the molded articles. The bottom plate is pulled down leaving the prongs and core pins in the tube bases and ready for the ejecting operation. An ejector plate 40, Fig. 3 is now brought in position below the chase and is moved up in contact with the projecting lower ends of the core pins and these pins are moved up through the prong bores, as shown in Fig. 3. This movement is accompanied by loosening and freeing of the core pin heads from the lips of the prongs. In some cases in the molding operation a thin film of the moldable material may be formed over the core pin heads, but this film is readily broken away as the core pins are forcibly lifted by upward movement of the ejector plate. Thereafter the upward movement of the ejector plate is continued until it contacts with the under face of the chase. In this movement the plate first engages the lower ends of the prongs and then moves them and the tube bases with which they are united sufficiently to free the articles in the mold pockets ready for easy hand removal. The articles, either in a group connected by a thin web of excess material, as above referred to and explained in the above identified application, or separately, are inverted, and the core pins shaken or knocked out into a convenient receptacle ready for re-use.

The tube bases with their integral inserts are now completed, except for additional or minor operations which may in some cases be necessary, and which do not form a part of the present invention. The tubular formation of the prongs is complete and no further operation is required to produce or complete this tubular formation, as in the companion application above identified. No moldable material has gained access to the interior of the prong, or if in any case a small amount of the bakelite enters the upper part of the prong and is fused and set therein, such material will only be located in the enlarged portion or chamber 9 and will not interefere in any way with the insertion of the audion valve elements into the prongs, or their connection by soldering in the lower prong bores 10, which are entirely clean and clear and ready for such soldering.

As above stated, the invention is not limited in its broader aspects to the production of these specific articles. The apparatus and method adapted for the production of the particular articles described, represents in a broader aspect means and methods for making the great variety of moldable articles in which originally separate inserts are incorporated, and especially when such inserts are tubular and entry of the moldable material into the tubular formations is prevented by the use of core pins substantially in the manner described.

I claim:

1. A molding method comprising detachably supporting a hollow insert with a core piece therein on a carrier and passing the insert into a mold pocket of a mold body, charging the pocket with moldable material, forming the moldable material in the pocket and about the insert, withdrawing the molded article from the mold pocket and from the insert carrier and removing the core piece.

2. A molding method comprising detachably supporting a plurality of tubular inserts on a carrier with a core pin in each insert closing the upper end thereof, moving the carrier to place upper portions of the inserts in a mold pocket of a mold body, charging the pocket with moldable material, inserting a former in the pocket to shape the moldable material and form it about portions of the inserts, removing the finished article from the pocket, and removing the core pins from the inserts.

3. A molding method comprising detachably supporting a plurality of tubular inserts on a carrier with a core pin in each insert closing the upper end thereof, moving the carrier to place upper portions of the inserts in a mold pocket of a mold body, charging the pocket with moldable material, inserting a former in the pocket to shape the moldable material and form it about portions of the inserts, removing the former, applying pressure to loosen the core pins, and then applying further pressure to the inserts to free the completed article in the mold pocket.

4. A molding method comprising detachably supporting a plurality of tubular inserts on a carrier with a core pin in each insert closing the upper end thereof, moving the carrier to place upper portions of the inserts in a mold pocket of a mold body, charging the pocket with moldable material, inserting a former in the pocket to shape the moldable material and form it about portions of the inserts, removing the former, applying pressure to loosen the core pins, then applying further pressure to the inserts to free the completed article in the mold pocket, and removing the core pins from the inserts.

5. A molding method comprising supporting a plurality of tubular inserts detachably on a carried, with a headed core pin in each insert, pressing down the core pin heads to tighten them in and close the upper ends of the inserts, moving the carrier to place upper portions of the inserts in a mold pocket of a mold body, charging the pocket with moldable material, inserting a former in the pocket to shape the moldable material and form it about portions of the inserts, removing the former, removing the finished article from the pocket, and removing the core pins from the inserts.

6. Molding apparatus comprising a chase having a mold pocket and insert aperture extending from the pocket to one face of the chase, an insert carrier arranged to detachably support one or more tubular inserts and to locate upper portions of the inserts in the pocket, a core pin detachably located in each insert to close the upper end thereof, and a force plug to shape moldable material in the pocket and about portions of the inserts located therein.

7. Molding apparatus comprising a chase having a mold pocket and insert aperture extending from the pocket to one face of the chase, an insert carrier arranged to detachably support one or more tubular inserts and to locate upper portions of the inserts in the pocket, a core pin detachably located in each insert to close the upper end thereof, a force plug to shape moldable material in the pocket and about portions of the inserts located therein, and an ejector plate substitutable for the insert carrier and adapted to engage projecting portions of the core pins and free them in the inserts.

8. Molding apparatus comprising a chase having a mold pocket and insert aperture extending from the pocket to one face of the chase, an insert carrier arranged to detachably support one or more tubular inserts and to locate upper portions of the inserts in the pocket, a core pin detachably located in each insert to close the upper end thereof, a force plug to shape moldable material in the pocket and about portions of the inserts located therein, and an ejector plate substitutable for the insert carrier and adapted to engage projecting portions of the core pins and free them in the inserts, and also to engage the inserts and free the completed article in the mold pocket or eject the completed article more or less from the mold pocket.

9. Molding apparatus comprising a chase having one or more mold pockets and insert aperture extending substantially from the bottom of each pocket to an adjacent face of the chase, an insert plate having plugs corresponding to the mold pockets and adapted to enter and close the insert apertures therein, each plug being adapted to detachably support one or more tubular inserts with a head portion thereof located within the pocket, a headed core pin detachably located in each insert and closing the upper end thereof, and a force plate having plugs corresponding to the pockets to shape moldable material therein and form it about the insert head, access of the moldable material to the hollow formations of the inserts being substantially prevented by the core pins or their heads.

10. Molding apparatus comprising a chase having one or more mold pockets and an insert aperture extending substantially from the bottom of each pocket to an adjacent face of the chase, an insert plate having plugs corresponding to the mold pockets and adapted to enter and close the insert apertures therein, each plug being adapted to detachably support one or more tubular inserts with a head portion thereof located within the pocket, a headed core pin detachably located in each insert and closing the upper end thereof, and a force plate having plugs corresponding to the pockets to shape moldable material therein and form it about the insert head, access of the moldable material to the hollow formations of the inserts being substantially prevented by the core pins or their heads, and an ejector plate substitutable for the insert plate and adapted to engage projecting portions of the core pins and loosen them in the inserts.

11. Molding apparatus comprising a chase having one or more mold pockets and an insert aperture extending substantially from the bottom of each pocket to an adjacent face of the chase, an insert plate having plugs corresponding to the mold pockets and adapted to enter and close the insert apertures therein, each plug being adapted to detachably support one or more tubular inserts with a head portion thereof located within the pocket, a headed core pin detachably located in each insert and closing the upper end thereof, and a force plate having plugs corresponding to the pockets to shape moldable material therein and form it about the insert head, access of the moldable material to the hollow formations of the inserts being substantially prevented by the core pins or their heads, and an ejector plate substitutable for the insert plate and adapted to engage projecting portions of the core pins and loosen them in the inserts, and also adapted by further movement to engage the inserts and loosen the completed articles in the mold pockets or eject them therefrom.

12. In molding apparatus of the class described an insert plate having one or more insert plugs to co-operate with mold apertures, each plug having one or more holes adapted to detachably receive inserts with head portions of the latter projecting above the plugs for location within a mold pocket.

13. For use in molding methods and apparatus described, a hollow insert adapted for detachable location on a carrier for placing the insert in a mold pocket, the insert having near its head a shoulder to rest upon a portion of the carrier, and a core pin having a stem adapted for location within the hollow insert and a head adapted to close the upward end thereof against ingress of moldable material.

14. For use in molding methods and apparatus described, a tubular insert adapted for detachable location on a carrier for placing the insert in a mold pocket, the insert having an enlarged head chamber communicating with the main bore of the insert and adapted for co-operation with a headed core pin.

15. For use in molding apparatus and methods described, the combination of a tubular insert and a headed core pin detachably insertable in the insert and adapted to close one end of the latter against ingress of moldable material.

16. For use in molding apparatus and methods described, the combination of a tubular insert having a supporting shoulder and an enlarged chamber communicating with the main insert bore, and a core pin having a stem detachably insertable in the main bore of the insert and an enlarged or tapered head to co-operate with the lip of the insert around said enlargement or chamber and spread the lip or seal the insert against ingress of moldable material.

17. Molding apparatus comprising a chase having a mold pocket, a force plate, a tubular insert and a core plug co-operating therewith, the insert plate having means for supporting the insert with its plug for location in the chase mold pocket, the plug preventing entrance of moldable material into the insert and being removable after the molding operation.

Signed at New York city, in the county of New York and State of New York, this 17 day of Sept., A. D. 1925.

GEORGE HOWLETT DAVIS.